United States Patent
Kim

(10) Patent No.: US 8,948,314 B2
(45) Date of Patent: Feb. 3, 2015

(54) SYMBOL TIMING RECOVERY WITH MULTI-CORE PROCESSOR

(71) Applicant: The Johns Hopkins University, Baltimore, MD (US)

(72) Inventor: Scott C. Kim, Glen Burnie, MD (US)

(73) Assignee: The John Hopkins University, Baltimore, MD (US)

( * ) Notice: Subject to any disclaimer, the term of this patent is extended or adjusted under 35 U.S.C. 154(b) by 0 days.

(21) Appl. No.: 14/055,983

(22) Filed: Oct. 17, 2013

(65) Prior Publication Data
US 2014/0119481 A1    May 1, 2014

Related U.S. Application Data

(60) Provisional application No. 61/720,624, filed on Oct. 31, 2012.

(51) Int. Cl.
| | |
|---|---|
| *H03D 3/24* | (2006.01) |
| *H04L 7/00* | (2006.01) |
| *H04B 1/7093* | (2011.01) |

(52) U.S. Cl.
CPC ................................. *H04B 1/7093* (2013.01)
USPC .......................................... 375/327; 375/355

(58) Field of Classification Search
CPC . H04L 7/0029; H04L 29/06027; H04L 27/22; H04J 3/0608; H04N 21/4382
USPC .................................. 375/327, 343, 355, 376
See application file for complete search history.

(56) References Cited

U.S. PATENT DOCUMENTS

| | | | |
|---|---|---|---|
| 6,483,447 B1 | 11/2002 | Eglit | |
| 7,450,655 B2 | 11/2008 | Singh | |
| 7,697,641 B2 | 4/2010 | Haddadin et al. | |
| 7,903,118 B2 | 3/2011 | Iourcha et al. | |
| 2005/0213679 A1* | 9/2005 | Yamagata | 375/260 |
| 2007/0058623 A1* | 3/2007 | Moorti et al. | 370/389 |
| 2007/0283297 A1 | 12/2007 | Hein et al. | |
| 2008/0036783 A1 | 2/2008 | Kulkarni | |
| 2008/0240295 A1* | 10/2008 | Kim | 375/321 |
| 2010/0322326 A1* | 12/2010 | Arambepola et al. | 375/260 |
| 2011/0126056 A1 | 5/2011 | Kelleher et al. | |
| 2012/0257117 A1 | 10/2012 | Freundlich et al. | |

* cited by examiner

*Primary Examiner* — Don N Vo
(74) *Attorney, Agent, or Firm* — Noah J. Hayward

(57) ABSTRACT

A method of performing timing error detection includes receiving, by a multi-core processor, a data stream and up-sampling the data stream by a plurality of processing cores of the multi-core processor. The up-sampling is performed in parallel by the plurality of processing cores. The method includes selecting one sample per symbol of the data stream to generate a sampled data output. The method also includes performing symbol timing recovery based on the sampled data output to adjust a resampling point.

16 Claims, 3 Drawing Sheets

SYMBOL TIMING RECOVERY WITH MULTI-CORE PROCESSOR

CROSS-REFERENCE TO RELATED APPLICATIONS

This application is related to and claims the benefit of prior-filed, co-pending U.S. provisional application Ser. No. 61/720,624 filed on Oct. 31, 2012, the content of which is incorporated herein by reference in its entirety.

BACKGROUND

1. Field

Exemplary embodiments of the present invention relate to symbol timing recovery and, in particular, to symbol timing recovery with a multi-core processor.

2. Description of the Related Art

In communications systems, a transmitter sends information to a receiver over time in the form of a data stream made up of symbols, such as bits of data. To accurately interpret the data, the receiver and transmitter should operate according to a common clock. However, while the receiver knows the transmission frequency, the receiver clock is typically not truly synchronized with the transmitter clock. When data is transmitted over a wireless communication channel, it is corrupted due to various types of noise, such as fading, oscillator drift, frequency and phase offset, and receiver thermal noise. At the receiver, the system is subject to noise and timing jitter in time domain. As a result, the receiver needs to correctly recover the clock associated with the received signal from the signal itself. The process of recovering the correct clock signal or synchronization information from the received signal of transmitted symbols is called symbol timing recovery (STR).

A timing recovery subsystem must be able to sample the data at a correct instant and detect its peak for correct symbol timing recovery. Sampling just once at the receiver is ineffective due to noise—e.g., additive white Gaussian noise (AWGN). However, a matched filter (MF) can limit the noise at the receiver and provide a high signal-to-noise ratio (SNR) sampling point (due to correlation gain).

The matched filter is a time-reversed and delayed version of the transmitted waveform. To maximize the signal-to-noise ratio for the detection, a demodulator must form inner-products between the incoming signal and a reference signal. That means it must time-align the locally generated reference signal with the received signal. Since the inner-product is formed in a convolving filter, the demodulator must determine the precise time position to sample the input and output of the filter.

Various methods have been tried to implement receivers that not only detect but correct an incoming signal. These methods were first introduced in the analog domain. However, with the availability of digital integrated circuits, the process has been converted over to the digital domain using transformation methods. A typical process for correcting an incoming signal at a receiver employs a phase-locked loop (PLL), which has 3 major components: 1. a timing error detection (TED) circuit; 2. loop filter (LF) for averaging the error; and 3. a controlled oscillator, such as a numerically controlled oscillator (NCO), to advance or retard the timing so that the peak of the incoming signal is matched with the reference signal. There are several widely used methods in timing error detection. The goal of timing-error detection is a TED that yields a high signal-to-noise ratio, and is resource-efficient while maintaining the lowest possible sampling rate (ideally, 1 sample per symbol (spS)).

Maximum-likelihood TED is one example of TED that seeks to meet this goal. Maximum-likelihood TED seeks the peak of correlation output using derivative matched filter (dMF). Other examples of methods used in timing error detection include early-late gate algorithm (ELGA), which essentially finds the derivative by approximation using early, current, and late samples; and Mueller and Muller algorithm, which requires 1 spS but its carrier recovery must be performed before symbol timing recovery. In embodiments of the present invention, matched filter operation is combined with poly-phase filter operation, and in particular with a poly-phase up-sample operation to create a poly-phase matched filter which performs up-sampling and filtering at the same time for timing error detection.

Graphics processing units (GPUs) enable efficient heterogeneous computing. Modern GPU platforms comprise one or more CPU cores and one or more GPUs, which have many powerful arithmetic engines capable of simultaneously running large numbers of lightweight threads. For example, some GPUs presently have 216 processor cores, which collectively allow for more than 165,000 active threads. GPUs process active threads concurrently and to enhance the efficiency of such concurrent execution, no swapping or sharing among concurrent threads occurs. The threads are allocated separately and remain that way until they complete execution.

To efficiently utilize a GPU platform, the programmer must structure the implementation such that GPU threads are kept as busy as possible. This means that opportunities for independent parallel execution must be identified, and spread across the GPU for effective resource utilization.

SUMMARY

Embodiments of the invention include method of performing timing error detection including receiving, by a multi-core processor, a data stream and up-sampling the data stream by a plurality of processing cores of the multi-core processor. The up-sampling is performed in parallel by the plurality of processing cores. The method includes selecting one sample per symbol of the data stream to generate a resampled data output. The method also includes performing symbol timing recovery based on the sampled data output to adjust the resampling point.

Additional aspects of the invention relate to a multi-core processor including a timing error generating circuit and a symbol timing recovery circuit. The timing error generating circuit is configured to receive as an input a data stream, to up-sample the data stream, by a plurality of cores of the multi-core processor, to generate an up-sampled signal, and to down-sample the up-sampled signal to generate a sampled signal. The symbol timing recovery circuit is configured to perform parallel symbol timing recovery of a plurality of sample signals of the data stream by a plurality of processing cores of the multi-core processor based on timing error signals generated based on the respective plurality of sample signals.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

The forgoing and other features and advantages of exemplary embodiments of the invention are apparent from the following detailed description taken in conjunction with the accompanying drawings in which.

DETAILED DESCRIPTION

Symbol timing recovery of a received signal controls a sample rate at which samples are taken of the received signal, and the symbol timing recovery is used to synchronize a transmitter and receiver using the transmitted signal. Embodiments of the invention utilize a multi-core processor, such as a graphics processing unit (GPU), to accelerate symbol timing recovery by performing timing error detection and symbol timing recovery calculations in parallel by processing cores or threads of the multi-core processor.

Figure 1:
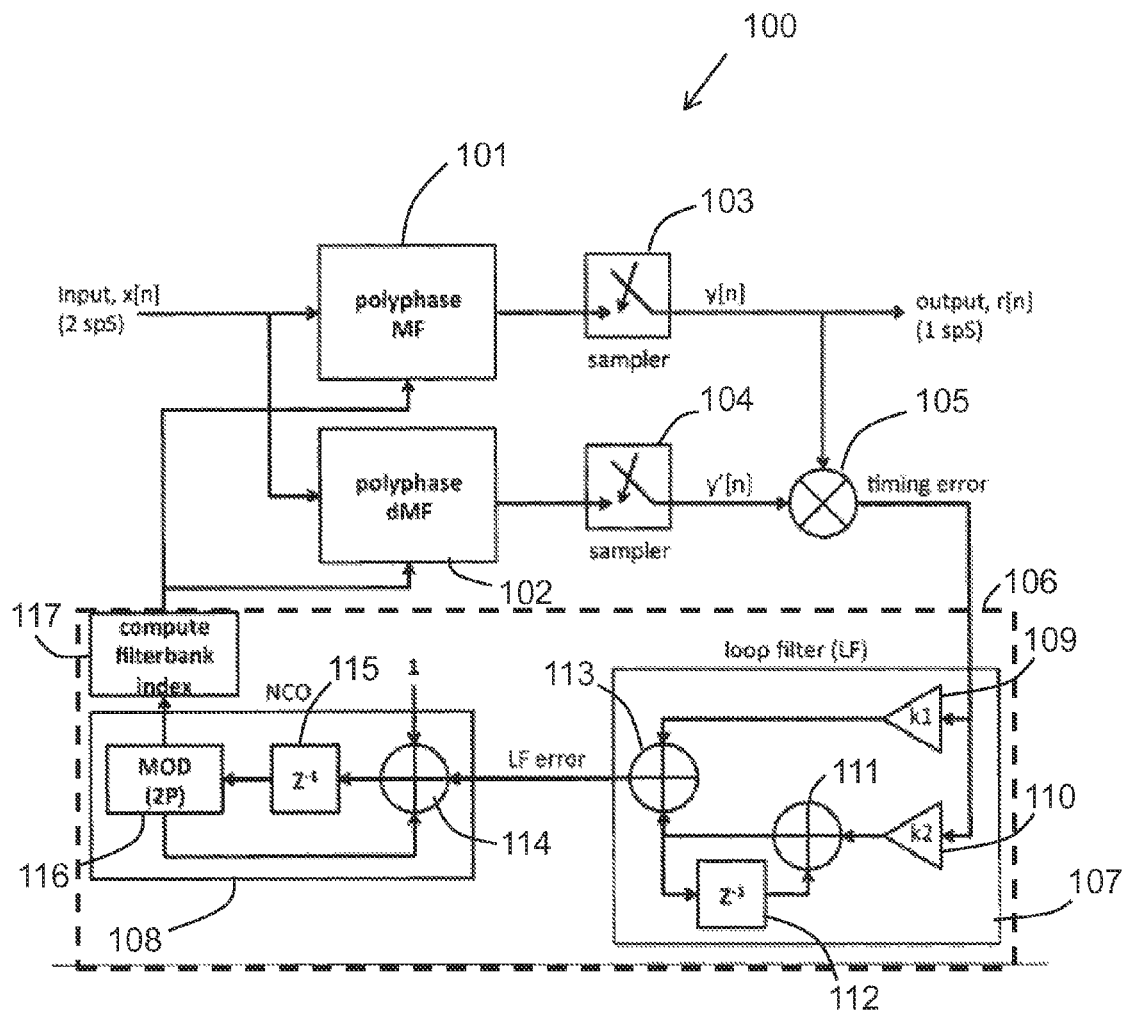
FIG. 1 illustrates a block diagram of a symbol timing recovery system according to an embodiment of the invention.

FIG. 1 illustrates a block diagram of symbol timing recovery system 100 according to an embodiment of the invention. In one embodiment, the block diagram of FIG. 1 illustrates a configuration of circuitry in a multi-core processor, such as a graphics processing unit including multiple processing cores. In addition, the block diagram of FIG. 1 may represent the programming of the multi-core processor by software to control the multi-core processor to receive data, process the data, and output the data. In one embodiment, the symbol timing recovery system 100 is a receiver that receives a signal, such as a waveform.

In FIG. 1, the symbol timing recovery system 100 receives a signal or data stream x[n] having a sampling rate of at least 2 samples per symbol (spS). In other words, each symbol, or bit, of data-to-be-transmitted is sampled twice and then transmitted to the symbol timing recovery system 100, such that each symbol is represented by two bits of transmitted data in the data stream x[n]. In embodiments of the invention, the signal x[n] may be received by wire or wirelessly through the air via an antenna. While a sampling rate of 2 spS is provided in FIG. 1 for the data stream x[n], embodiments of the invention are not limited to this sampling rate.

The received signal x[n] is input to a poly-phase matched filter 101 and a poly-phase derivative matched filter 102. The poly-phase matched filter 101 and the poly-phase derivative matched filter 102 up-sample the received signal x[n]. The samplers 103 and 104 select a sample point for each symbol of the up-sampled outputs of the matched filters 101 and 103, respectively, and discard the remaining samples. A desired sampling point is determined by analyzing a slope of the outputs of the matched filters 101 and 102. For example, if a slope of the matched filters is positive, then it may be determined that the timing estimate for the sampling is too early. In contrast, if the slope of the outputs of the matched filters is negative, then it may be determined that the timing estimate for the sampling is too late. The timing estimate is continuously adjusted such that the slope reaches zero where the optimal sampling instance is found. The timing phase is adjusted by a timing recovery circuit 106 to select the correct sample points in this feedback based system. Similarly, a feed-forward system can be used, which would replace the feedback circuit 106 with a direct estimation circuit where timing error is averaged and resampling instance is calculated without requiring circuit 106.

Once the correct sample point has been selected at the output of the matched filters 101 and 102, respectively, the remaining interpolated samples generated by the matched filters 101 and 102 are discarded. For example, in the data stream or input signal x[n] of FIG. 1 at 2 spS, if the data stream is up-sampled the matched filters 101 and 102 at 1:32 interpolation, then there are 64 samples to choose from for each symbol at the outputs of the matched filters 101 and 102. The samplers 103 and 104 sample once at the peak and discard the remaining 63 samples. The sampled value y[n], or output symbol, is provided as an output r[n] to subsequent processing circuitry. For example, the sampled value y[n] may be provided to error correction circuitry or other receiver circuitry downstream from the symbol timing recovery system 100. The sampled value y[n] is also combined with the derivative sample y'[n] by the summing circuit 105 to generate a timing error signal.

An example implementation of a poly-phase interpolation is provided below. However, it is understood that embodiments of the invention are not limited to the particular example provided. By using a poly-phase interpolator to interpolate at a very high rate to achieve arbitrary re-sampler-like performance, and by carefully mapping the filter operations into efficient parallel realizations on the GPU, the TED is mapped onto a targeted multi-core processor architecture. The filter equation has two parts, one for multiply-and-accumulate (MAC) operations to perform the inner-product between two vectors—the input array and filter coefficients, and the other for indexing through the filterbanks.

A typical poly-phase interpolator implementation can be described as shown in Algorithm 1.

| Algorithm 1: |
| --- |
| for jj = 0 to P − 1 do<br>  for ii = 0 to M − 1 do<br>    prod = h[ii × P + jj] × r[ii]<br>    accum = accum+prod;<br>  end for<br>end for |

Here, h is the filter array, r is an array of input samples, P is the interpolation rate, and M is the length of a sub-filter. Thus, the original filter length is N=P×M.

According to another embodiment, sample interpolation is performed by a multi-core processor including the matched filters 101 and 102 using a poly-phase filter matrix. An example of an implementation of a poly-phase filter matrix P×M is provided below. Due to its 2-dimensional structure, double for-loops are used to accomplish this filtering task, which serially indexes through the filter taps and input samples. Multiple forms of parallelism are utilized by the multi-core processor to implement the sampling interpolation using the poly-phase filter matrix. Specifically, the multi-core processor performs parallelization across the filterbanks (outer loop, jj index), across the filter (inner loop, ii index), and at a higher level, across the filter and the filterbanks.

To parallelize across the filterbanks, the multi-core processor may utilize the independence of accumulation across the filterbanks. An example of a computation structure for interpolation using the poly-phase filter matrix P×M is described in Algorithm 2.

Algorithm 2:

```
for ii = 0 to M - 1 do
    prod = h[ii × P + iy] × r[ii]
    accum[iy] = accum[iy] + prod
end for
```

As shown in Algorithm 2, jj of Algorithm 1 is replaced with iy, which is the poly-phase filterbank index, and one filterbank is placed in each block in the multi-core processor. Thus, each bank produces one interpolated value or an interpolant. In addition, parallelization may be performed across the filter (ii index) itself. In such an embodiment, one multiply operation is assigned to one thread in a block. Accordingly, the term ii in Algorithm 1 is replaced with ix, which is the thread index of the block. A resulting computational structure is described below in Algorithm 3.

Algorithm 3:

```
prod = h[ix × P + iy] × r[ix]
SYNC
for kk = 0 to M - 1 do
    accum = accum + prod[kk]
end for
```

In this embodiment, the filter is accessed via thread index ix and bank index, iy, and the threads may be synchronized.

The symbol timing recovery system 100 includes the timing recovery circuit 106 that receives the timing error signal from the multiplication circuit 105 and adjusts the poly-phase filter bank indexing of the matched filters 101 and 102 at the same time that the output sample value y[n] is being generated.

The timing recovery circuit 106 includes a loop filter 107 and a numerically-controlled oscillator (NCO) 108. The loop filter 107 averages the timing error over time. In one embodiment, the loop filter 107 is also a sequential system that multiplies the detected timing error by loop filter gains to track the timing error over time. As illustrated in FIG. 1, the loop filter 107 includes gain elements 109 and 110, combination elements 111 and 113, and a delay element 112.

The NCO 108 counts at a predetermined rate, and the NCO varies the predetermined rate according to the timing error. The NCO 108 turns the averaged error from the loop filter 107 into filter indexing using the filter bank index 117. The indexed values are provided to the matched filters 101 and 102 to adjust the sampling rates of the matched filters 101 and 102. In one embodiment, the NCO 108 is a sequential system that counts up at a certain rate and wraps around after it reaches its peak. In one embodiment, the NCO 108 includes an embedded control circuit scale the output of the loop filter 107 so that the NCO 108 speeds up or down depending on the error value relative to the peak. As illustrated in FIG. 1, the NCO 108 includes a summing circuit 114, a delay element 115, and a modulo or mod operation circuit 116 that outputs the remainder of division by the number of spS times the up-sample rate. For example, since the data stream x[n] in FIG. 1 has 2 spS, if the data stream x[n] is up-sampled by P, the mod is given as (2*P) to get the remainder which would be translated to poly-phase filterbank index. In one embodiment, the timing error is mapped by the timing recovery circuit 106 over a plurality of processing cores operating simultaneously and in parallel.

The timing error in a maximum-likelihood (ML)-based timing error detection (TED) method is defined as: $t_{error}[n] = y'[n] * y[n]$, where y[n] is the output of the matched filter 101 and y'[n] is the output of the derivative filter 102. Although the equation is particularly for low signal-to-noise ratio, it may be applied to any signal-to-noise ratio.

The number of interpolation points generated by the matched filters 101 and 102 corresponds to the number of filter banks. Therefore, with increasing numbers of filter banks, higher interpolation rates are achieved. In addition, since the loop filter 107 and the NCO 108 are run at 1 spS, a reference symbol, or matched filtered data, is aligned to the received data. Re-sampling is maintained and the reference symbol is re-aligned with the received sample. Detection time of the sample point is decreased, and throughput of the system is increased by performing faster locking of the sample.

Figure 2:
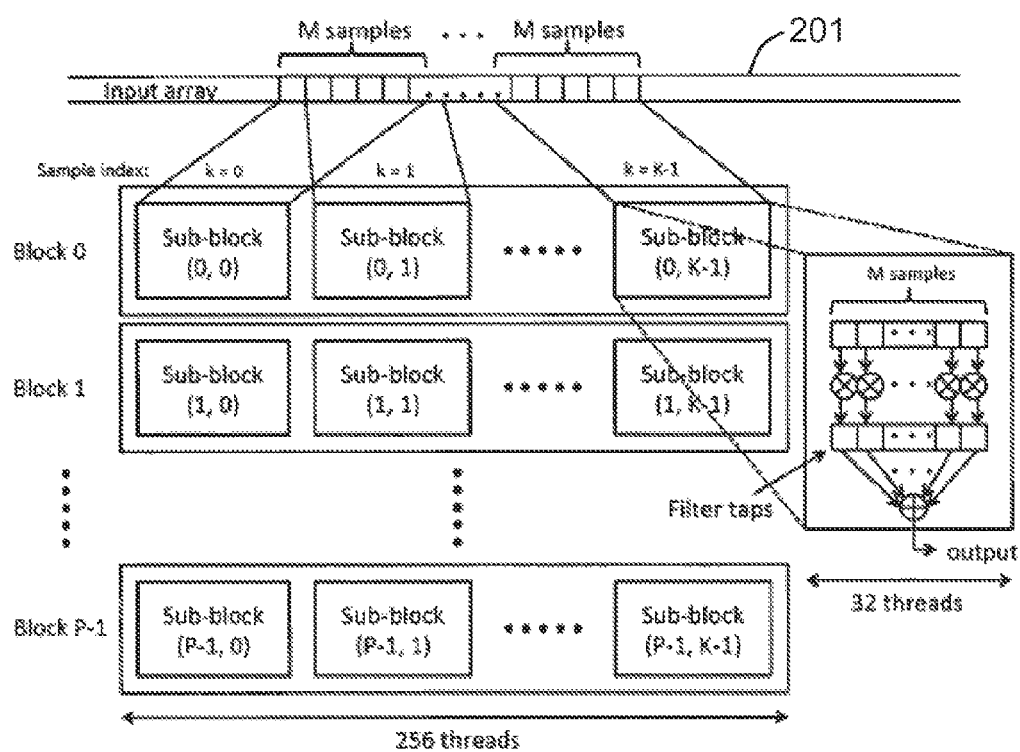
FIG. 2 illustrates a process of dividing a sampled data stream into blocks and sub-blocks for processing according to an embodiment of the invention.

FIG. 2 illustrates a method of parallel processing for symbol timing recovery according to an embodiment of the invention. As illustrated in FIG. 2, an input array 201 of samples is provided, corresponding to up-sampled signals output from the poly-phase matched filters 101 and 102 of FIG. 1. A multi-core processor executes operations according to blocks (Block 0, Block 1, . . . , Block P−1), each block made up of a predetermined number of threads. In one embodiment, the threads correspond to streams of instructions executed by a processing core, and in some embodiments a single processing core can simultaneously execute multiple threads. The multi-core processor is configured to execute the blocks (Block 0, Block 1, . . . , Block P−1) simultaneously. The multi-core processor further divides the input array 201 into sub-blocks of M samples, and each sub-block of samples is configured to be executed simultaneously with sub-blocks being executed in the other blocks (Block 0, Block 1, . . . , Block P−1).

In embodiments of the invention, the multi-core processor simultaneously processes multiple sub-blocks of samples to perform symbol timing recovery based on the samples of the particular sub-block being processed. In other words, instead of waiting for a group of samples to process, the multi-core processor performs symbol timing recovery of multiple sub-blocks of samples at the same time to generate a timing error quickly and to adjust the resampling index quickly.

Embodiments of the invention include multi-core or multi-threading processors and methods of performing symbol timing recovery by executing calculations in parallel with the multi-core, or multi-threading processor, such as a graphics processing unit. Embodiments encompass receiving a data stream, up-sampling the data stream, then selecting a sample point for each symbol in the data stream among the interpolated samples. In one embodiment, the up-sampling is performed by one or more poly-phase matched filters, and in one embodiment one or more of the up-sampling and sample selection is performed in parallel by multiple threads executing simultaneously on the multi-core processor.

Embodiments further include symbol timing recovery by using a timing error to adjust a sample rate, and in one embodiment the sample rate is adjusted by indexing the timing error over time to a sample bank index. While embodiments of the invention have been described with reference to a receiver, it is understood that embodiments of the invention also encompass transmitters.

Figure 3:
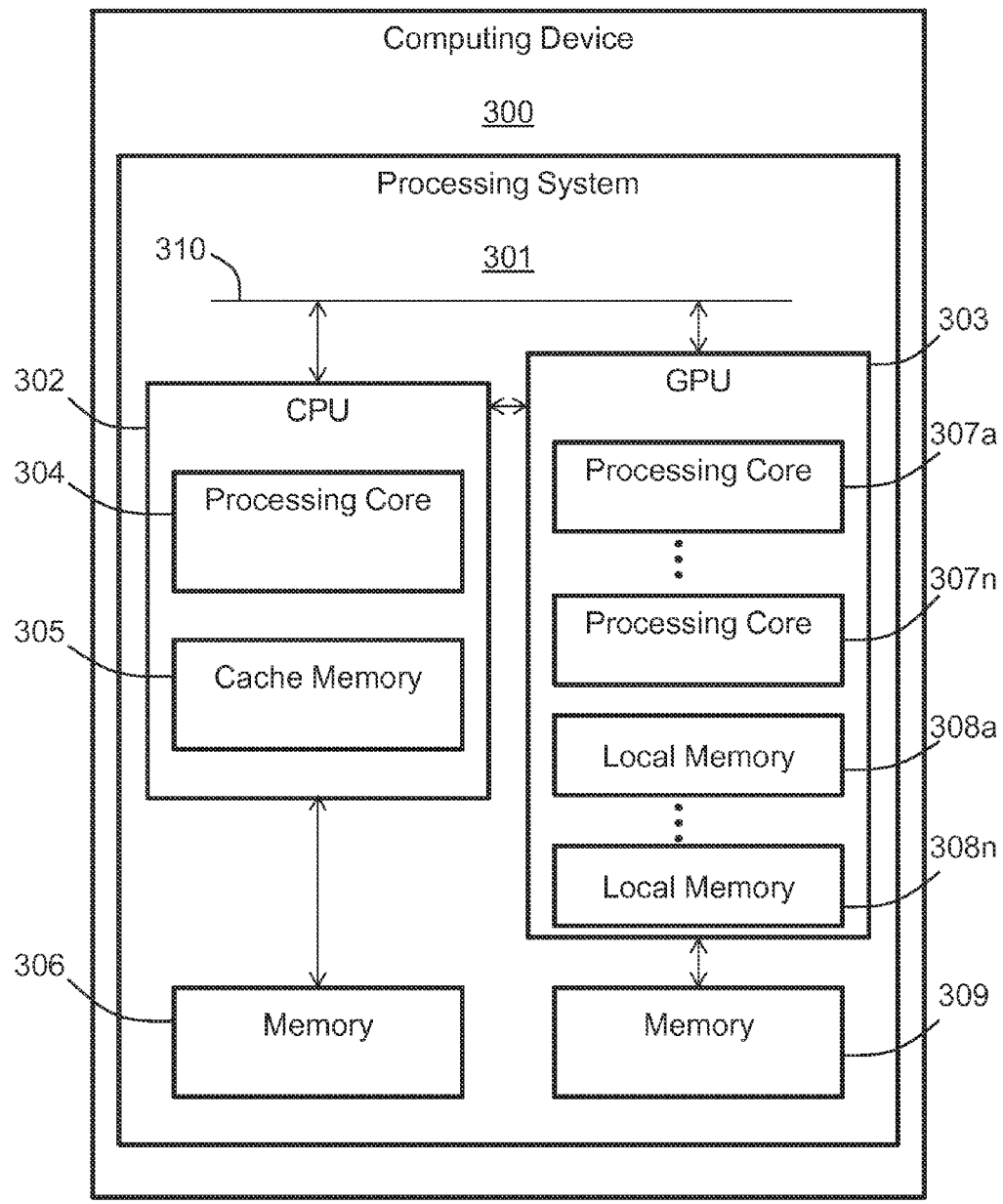
FIG. 3 is a block diagram of a computing system according to an embodiment of the invention.

Embodiments of the invention may be implemented in any computing system that transmits or receives data to or from a processing unit capable of separating a data stream and executing symbol timing recovery operations in parallel simultaneously. FIG. 3 illustrates a block diagram of a computing device 301 including a central processing unit 302 and a graphics processing unit (GPU) 303, where the GPU 303 is configured as a receiver to receive a data stream and perform symbol timing recovery of data in the data stream.

The computing device 300 includes a processing system 301 including the CPU 302 and the GPU 303. The CPU 302 is associated with memory 306 which may include volatile and non-volatile memory for storing instructions and data to be operated on. The GPU 303 is associated with memory 309, which may also include volatile and non-volatile memory for storing instructions and data to be operated on. The CPU 302 includes a processing core 304 and cache memory 305. The cache memory 305 typically functions as a short-term memory for storing data to be accessed quickly by the processing core 304. In some embodiments, the CPU 302 includes multiple processing cores 304.

The GPU 303 includes multiple processing cores 307a to 307n configured to operate in parallel. Each processing core 307a to 307n may further be associated with dedicated local memory 308a to 308n for that particular processing core. In embodiments of the invention, the processing cores 307a to 307n may simultaneously run separate threads, and in some embodiments each processing core 307a to 307n runs multiple threads simultaneously. In embodiments of the invention, the multiple processing cores 307a to 307n simultaneously perform symbol timing recovery calculations. In one embodiment, the simultaneous performance of the symbol timing recovery calculations includes simultaneous generation of timing error signals based on processing samples of a data stream.

The processing system 301 further includes a bus 310 for facilitating communications between the CPU 302 and GPU 303, as well as between the CPU 302, GPU 303, and external devices, such as transmitters, receivers, additional computing devices, or any other devices capable of transmitting or receiving data.

Embodiments of the invention relate to using a multi-core system to perform multiple timing error detection operations simultaneously using sub-block or sub-grouping of threads in a multi-core processor to speed up the timing recovery process. Embodiments of the invention also relate to using a multi-core processor to process multiple input streams to perform simultaneous timing recovery on different input streams. Embodiments of the invention also relate to using a multi-core processor itself or in conjunction with another processor to perform timing recovery. Embodiments relate to using a feedback or feed-forward architecture in a multi-core processor to perform timing recovery, and in particular, to using multiple cores to accelerate the timing error detection used in either configuration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments have been chosen and described in order to best explain the principles of the invention and the practical application, and to enable others of ordinary skill in the art to understand the invention for various embodiments with various modifications as are suited to the particular use contemplated.

While embodiments of the invention have been described, it will be understood that those of ordinary skill in the art may make various improvements and enhancements which fall within the scope of the claims which follow.

What is claimed is:

1. A method of performing timing error detection, comprising:
   receiving, by a multi-core processor, a data stream;
   up-sampling the data stream by a plurality of processing cores of the multi-core processor, the up-sampling performed in parallel by the plurality of processing cores;
   selecting one sample per symbol of the data stream to generate a resampled data output; and
   performing, by the plurality of processing cores, symbol timing recovery based on the resampled data output to adjust a resampling point, the symbol timing recovery performed in parallel by the plurality of processing cores.

2. The method of claim 1, wherein performing the symbol timing recovery includes using a phase-locked loop including a loop filter configured to map a timing error over time and a numerically-controlled oscillator (NCO) configured to count at a predetermined rate, the NCO configured to vary the predetermined rate to adjust the up-sampling rate according to the timing error, wherein the performing of the timing recovery is performed by performing the mapping of the timing error over time in parallel across the plurality of processing cores, and wherein calculating the predetermined rate is performed in parallel across the plurality of processing cores.

3. The method of claim 1, wherein the multi-core processor is configured to simultaneously process a first number of threads, the method comprising:
   forming a plurality of blocks, each block made up of an equal number of threads, and the total number of threads of the plurality of blocks being the first number of threads; and
   forming each of the plurality of blocks into a plurality of sub-blocks, each sub-block including a plurality of threads,
   wherein performing symbol timing recovery includes executing the plurality of sub-blocks in parallel by the plurality of cores of the multi-core processor.

4. The method of claim 3, wherein performing symbol timing recovery includes filter indexing a sampling error using a filter bank index, and providing indexed values to a matched filter to adjust the up-sampling rates of the matched filter.

5. The method of claim 1, wherein up-sampling the data stream comprises:
   passing the data stream through at least one poly-phase matched filter to up-sample the data stream to generate an up-sampled signal; and
   passing the up-sampled signal through a down-sampler to generate a sampled signal having a sample rate of one sample per symbol.

6. The method of claim 5, further comprising:
   passing the data stream through at least one poly-phase derivative matched filter to generate an up-sampled derivative signal;
   passing the up-sampled derivative signal through a second down-sampler to generate a derivative sample signal;

multiplying the sampled signal and the derivative sample signal to generate a timing error signal; and adjusting an poly-phase filter bank index of at least one of the poly-phase matched filter and the poly-phase derivative matched filter based on the timing error signal.

7. The method of claim 6, wherein adjusting the resampling point or polyphase filter bank index comprises:

passing the timing error signal through a loop filter to generate a loop filter error signal;

passing the loop filter error signal through a numerically-controlled oscillator (NCO) to compute filter index value; and controlling the sampling rate of the poly-phase matched filter and the poly-phase derivative matched filter based on the filter index value.

8. A multi-core processor, comprising:

a timing error generating circuit configured to receive as an input a data stream, to up-sample the data stream, by a plurality of cores of the multi-core processor, to generate an up-sampled signal, and to down-sample the up-sampled signal to generate a sampled signal; and a symbol timing recovery circuit configured to perform parallel symbol timing recovery of a plurality of sample signals of the data stream by a plurality of processing cores of the multi-core processor based on timing error signals generated based on the respective plurality of sample signals.

9. The multi-core processor of claim 8, wherein the symbol timing recovery unit includes a loop filter configured to map a timing error over time and a numerically-controlled oscillator (NCO) configured to count at a predetermined rate, the NCO configured to vary the predetermined rate according to the timing error to adjust an up-sampling rate of the timing error generating circuit.

10. The multi-core processor of claim 9, wherein the symbol timing recovery unit is configured to map the timing error over time in parallel across the plurality of processing cores, and the symbol timing recovery unit is configured to calculate the predetermined rate in parallel across the plurality of processing cores.

11. The multi-core processor of claim 8, wherein the multi-core processor is configured to simultaneously process a first number of threads by forming a plurality of blocks, each block made up of an equal number of threads, and the total number of threads of the plurality of blocks being the first number of threads, and by forming each of the plurality of blocks into a plurality of sub-blocks, each sub-block including a plurality of threads, and the multi-core processor is configured to perform parallel symbol timing recovery of the plurality of sample signals of the data stream by executing the plurality of sub-blocks of each of the plurality of blocks in parallel by the plurality of cores of the multi-core processor.

12. The multi-core processor of claim 8, wherein the timing error generation circuit comprises:

a poly-phase matched filter configured to receive as an input the data stream and to up-sample the data stream to generate an up-sampled signal; and a first down-sampler configured to receive as an input the up-sampled signal, to select one sample per symbol of the data stream, and to generate an output symbol based on the selected one sample.

13. The multi-core processor of claim 12, further comprising:

a poly-phase derivative matched filter configured to receive as an input the data stream and to up-sample the data stream to generate an up-sampled derivative signal;

a second down-sampler configured to receive as an input the up-sampled derivative signal, to select one sample per symbol of the data stream, and to generate a derivative sampled signal based on the selected one sample; and a multiplication circuit configured to combine the output symbol and the derivative sampled signal to generate a timing error signal.

14. The multi-core processor of claim 13, wherein the symbol timing recovery unit is configured to adjust an up-sampling rate of at least one of the poly-phase matched filter and the poly-phase derivative matched filter based on the timing error signal.

15. The multi-core processor of claim 14, wherein the symbol timing recovery unit is configured to adjust the up-sampling rate by passing the timing error signal through a loop filter to generate a loop filter error signal, by passing the loop filter error signal through a numerically-controlled oscillator (NCO) to compute a filter index value, and by controlling the sampling rate of the poly-phase matched filter and the poly-phase derivative matched filter based on the filter index value.

16. The multi-core processor of claim 8, wherein the multi-core processor is a graphics processing unit having multiple processing cores, each processing core configured to execute multiple threads in parallel.

* * * * *